J. M. AVERY.
RESILIENT WHEEL.
APPLICATION FILED MAY 6, 1916.
1,273,121.
Patented July 23, 1918.
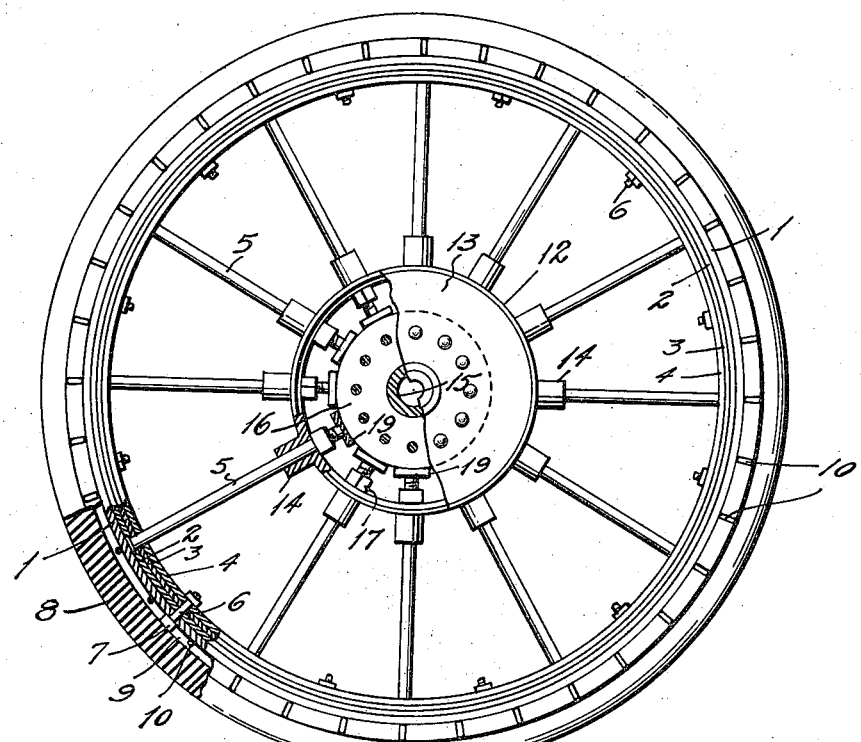
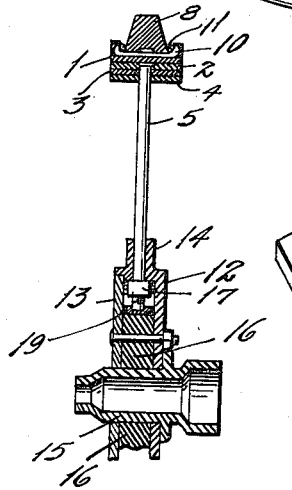
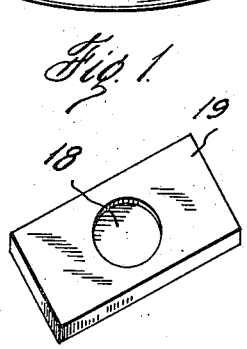
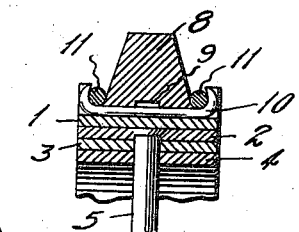
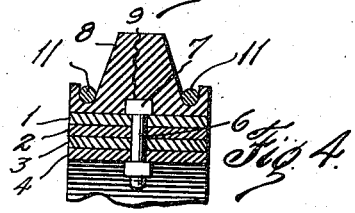
INVENTOR.
J. M. AVERY.
BY
ATTORNEY.

UNITED STATES PATENT OFFICE.

JOHN M. AVERY, OF DALLAS, TEXAS.

RESILIENT WHEEL.

1,273,121.    Specification of Letters Patent.    Patented July 23, 1918.

Application filed May 6, 1916. Serial No. 95,782.

*To all whom it may concern:*

Be it known that I, JOHN M. AVERY, citizen of the United States, residing at Dallas, in the county of Dallas and State of Texas, have invented certain new and useful Improvements in Resilient Wheels, of which the following is a specification.

This invention pertains to new and useful improvements in resilient wheels.

In carrying out the invention a resilient rim composed of a plurality of superimposed circumferential layers or rings is provided and attached to the outer ends of spokes which slide through radial bosses mounted on a hub member. Within the hub member a cushion is provided and wear plates disposed on the cushion are engaged by the inner ends of the spokes. On the inner ends of the spokes and within the hub member or housing nuts or other fastenings are placed and act to limit the outward displacement of the spokes.

This structure possesses an adequate resiliency and the rim not only yields where it rests on the ground but the hub housing hangs on the nuts of the upper spokes so that the load is resiliently suspended rather than supported.

Other features of the invention will be apparent from a perusal of the following specification and the invention will be more readily understood by reference to the accompanying drawing in which an example of the invention is shown and wherein:

Figure 1 is a side view of the wheel partially in section and partially in elevation, Fig. 2 is a radial sectional view, Fig. 3 is a transverse detail of the rim at one of the spokes, Fig. 4 is a similar section between the spokes, and Fig. 5 is a detail of one of the wear plates.

In the drawing the numeral 1 designates an outer annular rim member or ring in which are nested three other members or rings 2, 3 and 4 respectively. These rings have such diameters as to fit snugly one within the other and are made of spring steel of a very high grade. Spokes 5 have their outer ends passing through the rings 2, 3 and 4 with their extremities countersunk in the ring 2 and resting against the ring 1. Between the spokes the rings are fastened together by a plurality of radial bolts 6 passing therethrough and having square heads 7 projecting from the ring 1.

A rubber tire 8 has in its under side a circumferential central channel 9 into which the heads 7 project and hold said tire against lateral displacement. Transverse cleats 10 extend through the base of the tire and prevent circumferential locking rings 11 resting in the channels of the tire from spreading or being displaced laterally.

At the central portion of the wheel a hub housing 12 is provided and formed with one side open which is closed by a disk plate 13. On the periphery of the housing integral collars or bosses 14 are formed and provide bearings for the spokes 5 which pass therethrough. In the center of the housing a hub 15 is provided and this is surrounded by an annular member 16 formed of rubber or equivalent material. The member 16 has such a diameter as to leave an annular space between its periphery and the circular wall of the housing. The spokes project into this space and receive nuts 17 which bear against the inner surface of said housing wall. The inner ends of the spokes engage in seats 18 in wear plates 19 which latter bear on the periphery of the member 16.

It will be apparent that the nuts 17 limit the outward displacement of the spokes and thus the plates cannot be dislodged. These plates not only take the inward thrust of the spokes but prevent the wear which the ends of the spokes would impose on the rubber. It will be seen that any impact sustained by the resilient rim will cause an inward displacement of adjacent spokes which will be cushioned by the members 16; whereby the shock will be both absorbed and distributed through the agency of the resilient rim and the cushion member. The load sustained by the wheel will be carried in suspension as the housing 12 will tend to displace downward so that the load will be thrown upon the nuts 17 of the uppermost spokes which will be resiliently supported by the rim.

It is pointed out that this wheel will possess sufficient elasticity but there will be no tendency to produce an excessive rebound. The wheel is well braced against lateral distortion and the rim is sufficiently stout to lend stability.

What I claim is:

1. In a resilient wheel, a hub member, yieldable spokes radiating from the hub member, a metal resilient rim member confined on the outer ends of the spokes and comprising a plurality of contacting concentric spring metal rings penetrated by the spokes and a continuous outer spring metal ring member fitting snugly on the other rings and abutted by the ends of the spokes, all the ring members being united in one resilient rim member, the ends of the spokes being headed and the heads bearing against the inner surface of the outer ring member of the rim, and a tire carried by the rim, the outer ring member of the rim being interposed between the ends of the spokes and the tire, the heads of the spokes being immovable in the rim.

2. The combination with yieldable spokes, of a resilient rim member comprising a plurality of concentric contacting spring metal rings penetrated by the spokes and an outer metal ring embracing the other rings and bearing on the outer ends of the spokes, and bolts passed through all the rings between the spokes, said bolts having their heads projecting from the outer surface of the outer ring and constituting tire retaining lugs.

3. In a resilient wheel, the combination with a plurality of rigid spokes resiliently sustained at the hub of the wheel, said spokes having integral heads at their outer ends, of a rim comprising a plurality of resilient rings confined on the spokes under the heads thereof, and an outer resilient ring secured to the other rings and confining the heads of the spokes immovably in the said other rings and also covering the spoke heads.

4. In a resilient wheel, the combination with a plurality of rigid spokes resiliently sustained at the hub of the wheel, said spokes having integral heads at their outer ends, of a rim comprising a plurality of resilient rings confined on the spokes under the heads thereof, an outer resilient ring secured to the other rings and confining the heads of the spokes immovably in said other rings and also covering the spoke heads, and means for mounting a tire on the outer ring.

5. In a resilient wheel, the combination with a plurality of rigid spokes resiliently sustained at the hub of the wheel, said spokes having integral heads at their outer ends, of a rim comprising a plurality of resilient rings confined on the spokes under the heads thereof, an outer ring fitting snugly on the other rings and covering the spoke heads, and fastening devices passing through all the rings between the spokes and having projections on the outer ring constituting tire retaining devices.

6. In a resilient wheel, the combination with a plurality of rigid spokes yieldably sustained and having heads on their outer ends, of a plurality of inner resilient rim rings penetrated by the spokes the outermost of which rings has the heads of the spokes seated therein, and an outer resilient rim ring covering the spoke heads and fastened to the inner rim rings, the spokes being immovable relatively of the rim rings.

7. In a resilient wheel, the combination with a plurality of rigid spokes yieldably sustained and having heads on their outer ends, of a plurality of inner resilient rim rings penetrated by the spokes the outermost of which rings has the heads of the spokes seated therein, an outer resilient rim ring covering the spoke heads and fastened to the inner rim rings, the spokes being immovable relatively of the rim rings, and bolts passing through all the rim rings between the spokes.

In testimony whereof I affix my signature.

JOHN M. AVERY.